(12) United States Patent
Dubois et al.

(10) Patent No.: US 11,326,700 B2
(45) Date of Patent: May 10, 2022

(54) SEAT INSERT IN A BALL VALVE FOR CRYOGENIC APPLICATIONS

(71) Applicant: SAINT-GOBAIN PERFORMANCE PLASTICS CORPORATION, Solon, OH (US)

(72) Inventors: Herman M. Dubois, Duffel (BE); Philippe Burlot, Le Quillio (FR); Jan Kustermans, Brecht (BE); Filip Rousseau, Niel (BE); Simone Caglio, Giussano (IT); Denis Fernandez, Crêches sur Saône (FR); Christophe Valdenaire, Clapiers (FR)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

(21) Appl. No.: 17/111,849

(22) Filed: Dec. 4, 2020

(65) Prior Publication Data

US 2021/0199203 A1    Jul. 1, 2021

Related U.S. Application Data

(60) Provisional application No. 62/965,379, filed on Jan. 24, 2020, provisional application No. 62/955,966, filed on Dec. 31, 2019.

(51) Int. Cl.
*F16K 5/20* (2006.01)
*F16K 5/06* (2006.01)

(52) U.S. Cl.
CPC ............ *F16K 5/201* (2013.01); *F16K 5/0668* (2013.01); *F16K 5/0689* (2013.01); *F16K 5/0673* (2013.01)

(58) Field of Classification Search
CPC .... F16K 5/0689; F16K 5/0678; F16K 5/0673; F16K 5/0668; F16K 5/201
See application file for complete search history.

(56) References Cited

U.S. PATENT DOCUMENTS

| 3,030,068 A | * | 4/1962 | Priese | ................... F16K 5/0668 251/214 |
| 3,097,823 A | * | 7/1963 | Kaiser | ................... F16K 5/0678 251/172 |

(Continued)

FOREIGN PATENT DOCUMENTS

| CN | 207122606 U | 3/2018 | |
| DE | 4143306 A1 | * 10/1992 | ........... F16K 5/0673 |

(Continued)

OTHER PUBLICATIONS

International Search Report and Written Opinion for PCT/US2020/063237, dated Mar. 15, 2021, 9 pages.

*Primary Examiner* — David Colon-Morales
(74) *Attorney, Agent, or Firm* — Abel Schillinger, LLP; David G Miranda

(57) ABSTRACT

Systems and methods are disclosed that include providing a valve suitable for maintaining a seal and preventing fluid flow through the valve at cryogenic temperatures. The valve includes a valve body having a longitudinal axis along a flow path through the valve, a ball selectively rotatable within the valve body to selectively allow fluid flow through the valve, a seat formed within the valve body and comprising a cavity having an angled wall, and a seat insert at least partially disposed within the cavity and having a first sealing surface that forms a first sealing interface with the ball to prevent leakage through a first leakage path and a second sealing surface that forms a second sealing interface with the angled (Continued)

wall to prevent leakage through a second leakage path when the ball valve is selectively rotated to prevent fluid flow through the valve.

17 Claims, 3 Drawing Sheets

(56) References Cited

U.S. PATENT DOCUMENTS

| | | | | |
|---|---|---|---|---|
| 3,252,684 A * | 5/1966 | Ksieski | ............... | F16K 5/0668 251/172 |
| 3,384,341 A * | 5/1968 | Ripert | ............... | F16K 5/0668 251/315.14 |
| 3,458,171 A * | 7/1969 | Urban | ............... | F16K 5/0668 251/170 |
| 3,598,363 A * | 8/1971 | Shaw | ............... | F16K 5/0642 251/172 |
| 3,667,727 A | 6/1972 | Bowden | | |
| 4,258,900 A * | 3/1981 | Kindersley | ............... | F16K 5/0673 251/172 |
| 4,353,525 A * | 10/1982 | DiDomizio, Jr. | ............... | F16K 5/0678 251/174 |
| 4,637,421 A * | 1/1987 | Stunkard | ............... | F16K 5/0636 137/327 |
| 4,658,847 A | 4/1987 | McCrone | | |
| 4,673,164 A * | 6/1987 | Nakanishi | ............... | F16K 5/0673 251/174 |
| 6,695,285 B1 * | 2/2004 | Hotton | ............... | F16K 5/0631 251/314 |
| 9,518,664 B2 * | 12/2016 | Kothadia | ............... | F16K 5/0668 |
| 9,982,789 B2 * | 5/2018 | Mircea | ............... | F16K 5/0673 |
| 11,009,136 B2 * | 5/2021 | Berkovitz | ............... | F16K 5/205 |
| 2013/0068982 A1 * | 3/2013 | Alink | ............... | F16K 5/0668 251/315.1 |
| 2017/0328481 A1 | 11/2017 | Balan et al. | | |
| 2019/0170262 A1 | 6/2019 | Morello | | |
| 2020/0386324 A1 * | 12/2020 | Bach Cantenys | ............... | F16K 5/0678 |

FOREIGN PATENT DOCUMENTS

| | | | | |
|---|---|---|---|---|
| EP | 3343076 A1 | 7/2018 | | |
| FR | 2512157 A1 * | 3/1983 | ............ | F16K 5/0668 |
| GB | 2030270 A * | 4/1980 | ............ | F16K 5/0673 |
| JP | 2005048853 A | 2/2005 | | |
| JP | 2007232019 A | 9/2007 | | |

\* cited by examiner

SEAT INSERT IN A BALL VALVE FOR CRYOGENIC APPLICATIONS

CROSS-REFERENCE TO RELATED APPLICATION(S)

This application claims priority under 35 U.S.C. § 119(e) to U.S. Provisional Application No. 62/955,966, entitled "DESIGN FOR A SEAT INSERT IN A BALL VALVE FOR CRYOGENIC APPLICATIONS," by Herman M. DUBOIS et al., filed Dec. 31, 2019, and claims priority to U.S. Provisional Application No. 62/965,379, entitled "DESIGN FOR A SEAT INSERT IN A BALL VALVE FOR CRYOGENIC APPLICATIONS," by Herman M. DUBOIS et al., filed Jan. 24, 2020, all of which are assigned to the current assignee hereof and incorporated herein by reference in their entireties.

BACKGROUND OF THE INVENTION

Valves are used to control the flow of fluids in a wide range of applications. Ball valves are typically used in applications where interruption of the flow of fluid through the ball valve is required. The interruption and establishment of fluid flow through the ball valve is accomplished via selective actuation of a ball within the ball valve. Generally, a seat insert within the ball valve provides a seal against the ball and a portion of the body of the ball valve. However, when a ball valve is subjected to extreme environmental conditions such as cryogenic temperatures, the seat insert and/or other portions of the ball valve may shrink, deform, or otherwise change, thereby allowing leakage of the fluid through the ball valve. Accordingly, the industry continues to demand improvements in ball valve technology for such applications.

SUMMARY

Embodiments of the present invention relate in general to a ball valve having a seat insert configured to provide a fluid tight seal when operated at or subjected to cryogenic temperatures, and more particularly to a ball valve having a seat formed within the valve body that includes a cavity having an angled wall and a seat insert at least partially disposed within the cavity and having a first sealing surface that forms a first sealing interface with the ball to prevent leakage through a first leakage path and a second sealing surface that forms a second sealing interface with the angled wall to prevent leakage through a second leakage path when operated at or subjected to cryogenic temperatures. A spring acting against a fixing plate may bias the seat insert against the angled wall, and the angled wall may drive or force the seat insert upwards, thereby increasing a sealing force between the seat insert and the angled wall of the seat to prevent leakage through secondary leakage path when cryogenic temperatures may cause the seat, the seat insert, or combinations thereof to shrink in size.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Figure 1:
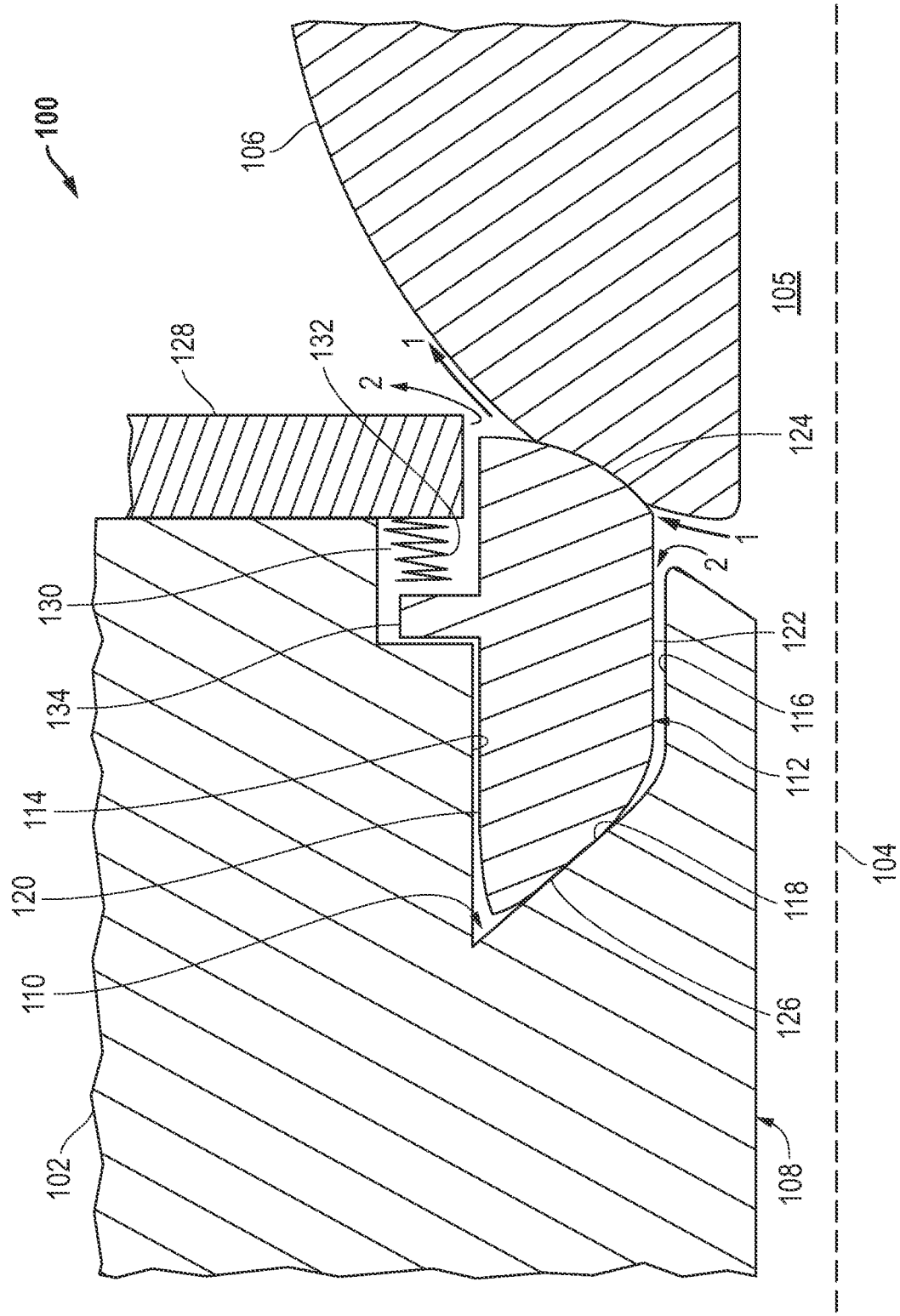
FIG. 1 is a partial cross-sectional view of a valve according to an embodiment of the disclosure.

FIG. 1 shows a partial cross-sectional view of a valve 100 according to an embodiment of the disclosure. Valve 100 may generally comprise a ball valve and comprise a valve body 102 having a longitudinal axis 104 along a flow path 105 through the valve 100 and a ball 106 selectively rotatable within the valve body 102 to selectively allow fluid flow along the flow path 105 and through the valve 100. Valve 100 may also comprise a seat 108 comprising a cavity 110 formed within the valve body 102 and a seat insert 112 at least partially disposed within the cavity 110. In some embodiments, the seat insert 112 may comprise a complementary profile and/or shape to the cavity 110 of the seat 108. Accordingly, it will be appreciated that the seat 108 and the seat insert 112 may be designed to prevent leakage of a fluid through each of a first leakage path (shown as "1" in FIG. 1) and a second leakage path (shown as "2" in FIG. 1) when the ball 106 is selectively rotated to prevent fluid flow along the flow path 105 and through the valve 100. Additionally, the valve 100 may also comprise a fixing plate 128 and one or more springs 132.

In some embodiments, the cavity 110 may comprise a first major surface 114 (top), a second major surface 116 (bottom) opposite of the first major surface 114, and an angled wall 118 disposed between the first major surface 114 and the second major surface 116. In some embodiments, the first major surface 114 and/or the second major surface 116 may be substantially planar. Additionally, in some embodiments, the first major surface 114 and the second major surface 116 may be substantially parallel. However, in other embodiments, the first major surface 114 and/or the second major surface 116 may be non-planar.

In some embodiments, the angled wall 118 may me substantially planar. In other embodiments, the angled wall 118 may be non-planar (e.g., curved). In yet other embodiments, the angled wall 118 may comprise any combination of substantially planar and non-planar features. In some embodiments, the angled wall 118 may form an angle with the longitudinal axis 104 of at least 5 degrees, at least 10 degrees, at least 15 degrees, at least 20 degrees, at least 25 degrees, at least 30 degrees, at least 35 degrees, at least 40 degrees, at least 45 degrees, at least 50 degrees, at least 55 degrees, at least 60 degrees, at least 65 degrees, at least 70 degrees, or at least 75 degrees. In some embodiments, the angled wall 118 may form an angle with the longitudinal axis 104 that is not greater than 90 degrees, not greater than 85 degrees, not greater than 80 degrees, not greater than 75 degrees, not greater than 70 degrees, not greater than 65 degrees, not greater than 60 degrees, not greater than 55 degrees, not greater than 50 degrees, not greater than 45 degrees, not greater than 40 degrees, not greater than 35 degrees, or not greater than 30 degrees. Further, it will be appreciated that the angled wall 118 may form an angle with the longitudinal axis 104 that is between any of these minimum and maximum values, such as at least 5 degrees and not greater than 90 degrees.

In some embodiments, the seat insert 112 may comprise a first major surface 120 (top) adjacent to the first major surface 114 of the cavity 110, a second major surface 122 (bottom) opposite of the first major surface 120 and adjacent to the second major surface 116 of the cavity 110, a first sealing surface 124 disposed between the first major surface 120 and the second major surface 122 and adjacent to the ball 106, and a second sealing surface 126 disposed between the first major surface 120 and the second major surface 122, opposite of the first sealing surface 124, and adjacent to the angled wall 118. In some embodiments, the seat insert 112 may also comprise an extension 134 extending from the first major surface 120. In some embodiments, the first major surface 120 and/or the second major surface 122 may be substantially planar. Additionally, in some embodiments, the first major surface 120 and the second major surface 122 may be substantially parallel. However, in other embodiments, the first major surface 120 and/or the second major surface 122 may be non-planar. In some embodiments, the first sealing surface 124 and/or the second sealing surface 126 may be substantially planar. However, in other embodiments, the first sealing surface 124 and/or the second sealing surface 126 may be non-planar (e.g., curved). In yet other embodiments, the first sealing surface 124 and/or the second sealing surface 126 may comprise any combination of substantially planar and non-planar features.

It will be appreciated that the first sealing surface 124 may be designed to form a first sealing interface with the ball 106 to prevent leakage through the first leakage path (shown as "1" in FIG. 1), and the second sealing surface 126 may be designed to form a second sealing interface with the angled wall 118 to prevent leakage through a second leakage path (shown as "2" in FIG. 1) when the ball 106 is selectively rotated to prevent fluid flow along the flow path 105 and through the valve 100. As such, in some embodiments, the second sealing surface 126 may comprise a complementary profile to the angled wall 118, such that in embodiments where the angled wall 118 is curved, the second sealing surface 126 may be curved, and in embodiments where the angled wall 118 is planar, the second sealing surface 126 may be curved, planar, or combinations thereof.

The first sealing surface 124 and the second sealing surface 126 may form a sealing angle. In some embodiments, the sealing angle may be defined as the angle between the first sealing surface 124 and the second sealing surface 126. For embodiments having one or more planar sealing surfaces, the sealing angle may be determined using a planar vector of the one or more sealing surfaces. For embodiments having one or more curved sealing surfaces, the sealing angle may be determined using a tangent vector extending from a midpoint of the one or more curved sealing surfaces. In some embodiments, the sealing angle may be at least 45 degrees, at least 50 degrees, at least 55 degrees, at least 60 degrees, at least 65 degrees, at least 70 degrees, or at least 75 degrees, at least 80 degrees, at least 85 degrees, or at least 90 degrees. In some embodiments, the sealing angle may be not greater than 135 degrees, not greater than 130, not greater than 125 degrees, not greater than 120 degrees, not greater than 115 degrees, not greater than 110 degrees, or not greater than 95 degrees. Further, it will be appreciated that the sealing angle may be between any of these minimum and maximum values, such as at least 45 degrees and not greater than 135 degrees.

In some embodiments, the first sealing surface 124 may form a first sealing angle with the longitudinal axis 104, and the second sealing surface 126 may form a second sealing angle with the longitudinal axis 104. In some embodiments, the first sealing angle may be greater than the second sealing angle. In other embodiments, the second sealing angle may be greater than the first sealing angle. In yet other embodiments, the first sealing angle and the second sealing angle may be substantially equal.

In some embodiments, the seat insert 112 may be formed from a polymeric material. Accordingly, in some embodiments, the seat insert 112 may be formed from PTFE, a fluoropolymer, a perfluoropolymer, PTFE, PVF, PVDF, PCTFE, PFA, FEP, ETFE, ECTFE, PCTFE, a polyarylketone such as PEEK, PEK, or PEKK, a polysulfone such as PPS, PPSU, PSU, PPE, or PPO, aromatic polyamides such as PPA, thermoplastic polyimides such as PEI or TPI, or any combination thereof. Still further, in some embodiments, the seat insert 112 may be formed from one or more of the materials listed above that are modified with at least one filler (e.g., fibers).

In some embodiments, the fixing plate 128 may be coupled to and/or integrated with the body 102 of the valve 100. In some embodiments, the fixing plate 128 may form a secondary cavity 130 within the cavity 110 of the seat 108. One or more springs 132 (formed from titanium, stainless steel, carbon steel, other alloys, or combinations thereof) may generally be disposed within the secondary cavity 130. In the embodiment shown, the spring 132 may comprise a standalone compression spring and be disposed within the secondary cavity 130 between the extension 134 of the seat insert 112 and the fixing plate 128. As such, the spring 132 may bias the extension 134 of the seat insert 112 against the fixing plate 128, thereby forcing the seat insert 112 towards the angled wall 118 and forcing the second sealing interface 126 into contact with the angled wall 118. In turn, the angled wall 118 forces the seat insert 112 upwards, thereby forcing the first major surface 120 of the seat insert 112 into contact with the first major surface 114 of the cavity 110 of the seat 108. The resulting contact thereby operates to substantially reduce and/or prevent leakage through the secondary leakage path.

In some embodiments, as compared to a traditional valve without an angled sealing interface, the angled wall 118 may increase a sealing force between the seat insert 112 and the seat 108 when cryogenic temperature conditions cause the seat insert 112 to shrink in size, deform, or otherwise change in profile or shape. In some embodiments, the angled wall 118 may increase the sealing force between the seat insert 112 and the seat 108 by at least 1%, at least 2%, at least 3%, at least 4%, at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 90%, at least 95%, at least 100%, at least 125%, or at least 150%. In some embodiments, the angled wall 118 may increase the sealing force between the seat insert 112 and the seat 108 by not greater than 500%, not greater than 400%, not greater than 300%, not greater than 200%, or not greater than 100%. Further, it will be appreciated that the angled wall 118 may increase the sealing force between any of these minimum and maximum values, such as at least 1% and not greater than 500%.

Figure 2:
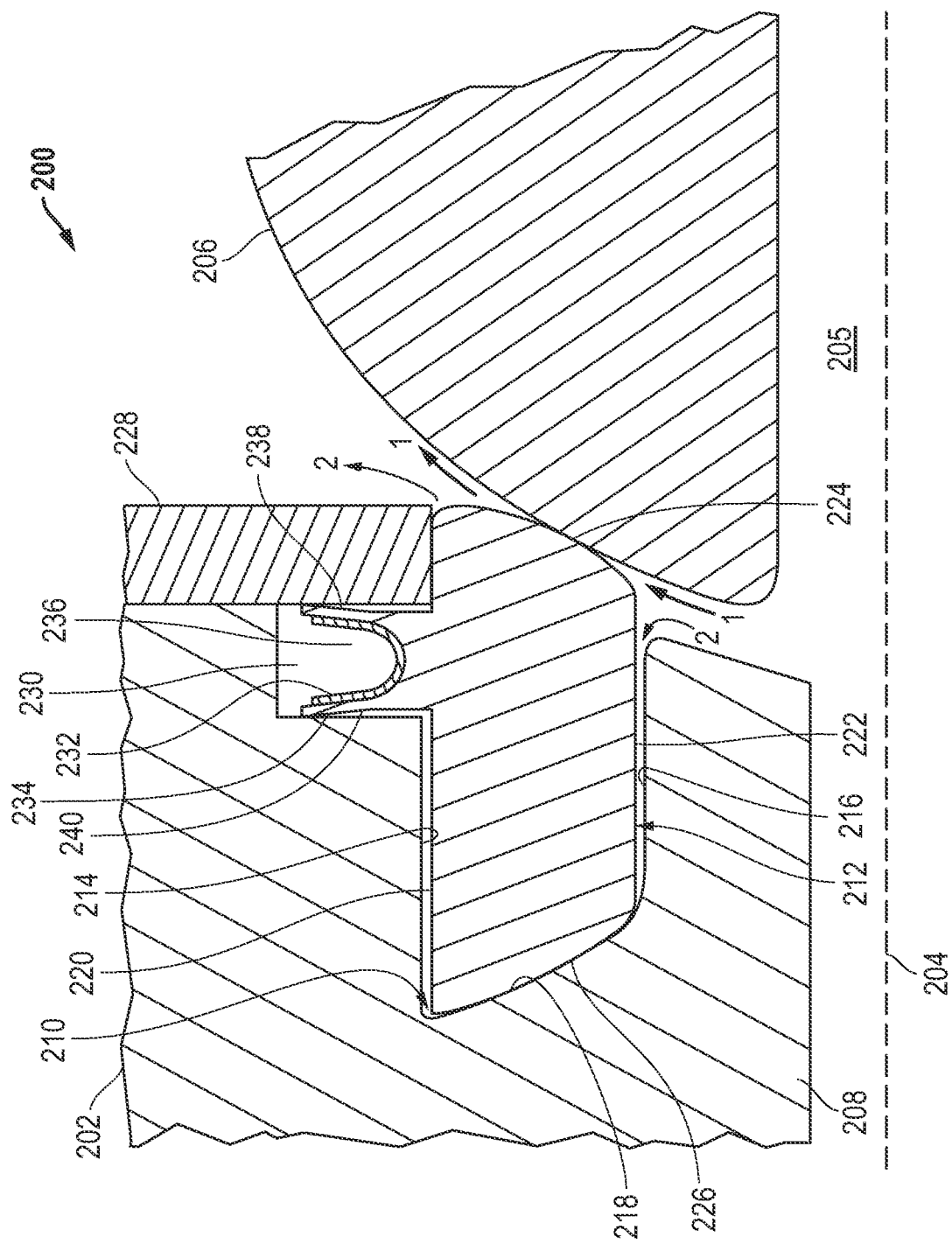
FIG. 2 is a partial cross-sectional view of a valve according to an embodiment of the disclosure.

FIG. 2 shows a partial cross-sectional view of a valve 200 according to an embodiment of the disclosure. Valve 200, and components thereof, may be substantially similar to valve 100. Valve 200 may comprise a ball valve and comprise a valve body 202 having a longitudinal axis 204 along a flow path 205 through the valve 200, a ball 206 selectively rotatable within the valve body 202 to selectively allow fluid flow along the flow path 205 and through the valve 200, a seat 208 comprising a cavity 210 (having a first major surface 214, a second major surface 216, and an angled wall 218) formed within the valve body 202, a seat insert 212 (having a first major surface 220, a second major surface 222, a first sealing surface 224, a second sealing surface 226, and an extension 234) at least partially disposed within the cavity 210, a fixing plate 228 that forms a secondary cavity 230, and one or more springs 232. However, in the embodiment shown, the spring 232 is integrated into the extension 234 of the seat insert 212.

The extension 234 may generally comprise a cavity 236. In some embodiments, the cavity 236 may comprise a U-shaped cavity formed between a pair of legs 238, 240. However, in other embodiments, the cavity 236 may comprise a rectangular-shaped cavity, a V-shaped cavity, or other-shaped cavity formed between the pair of legs 238, 240. One or more springs 232 (formed from titanium, stainless steel, carbon steel, or combinations thereof) may generally be disposed within the U-shaped cavity 236. In the embodiment shown, the spring 232 may comprise a U-shaped compression spring and be disposed within the U-shaped cavity 236 between the pair of legs 238, 240. However, in other embodiments, the spring 232 may comprise any other profile and/or shape that is complementary to the cavity 236. It will be appreciated that the extension 234 (with legs 238, 240) and/or the spring 232 may comprise an interference fit in the secondary cavity 230. As such, the spring 232 may bias the first leg 238 against the fixing plate 228 and bias the second leg 240 against an inner wall of the secondary cavity 230, thereby forcing the seat insert 212 towards the angled wall 218 and forcing the second sealing interface 226 into contact with the angled wall 218. In turn, the angled wall 218 forces the seat insert 212 upwards, thereby forcing the first major surface 220 of the seat insert 212 into contact with the first major surface 214 of the cavity 210 of the seat 208. The resulting contact thereby operates to substantially reduce and/or prevent leakage through the secondary leakage path, while preventing leakage through the primary leakage path.

Similarly to the angled wall 118 of valve 100, the angled wall 218 of valve 200 may increase a sealing force between the seat insert 212 and the seat 208 when cryogenic temperature conditions cause the seat insert 212 to shrink in size, deform, or otherwise change in profile or shape. In some embodiments, the angled wall 218 may increase the sealing force between the seat insert 112 and the seat 108 by at least 1%, at least 2%, at least 3%, at least 4%, at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 90%, at least 95%, at least 100%, at least 125%, or at least 150%. In some embodiments, the angled wall 218 may increase the sealing force between the seat insert 212 and the seat 208 by not greater than 500%, not greater than 400%, not greater than 300%, not greater than 200%, or not greater than 100%. Further, it will be appreciated that the angled wall 218 may increase the sealing force between any of these minimum and maximum values, such as at least 1% and not greater than 500%.

Figure 3:
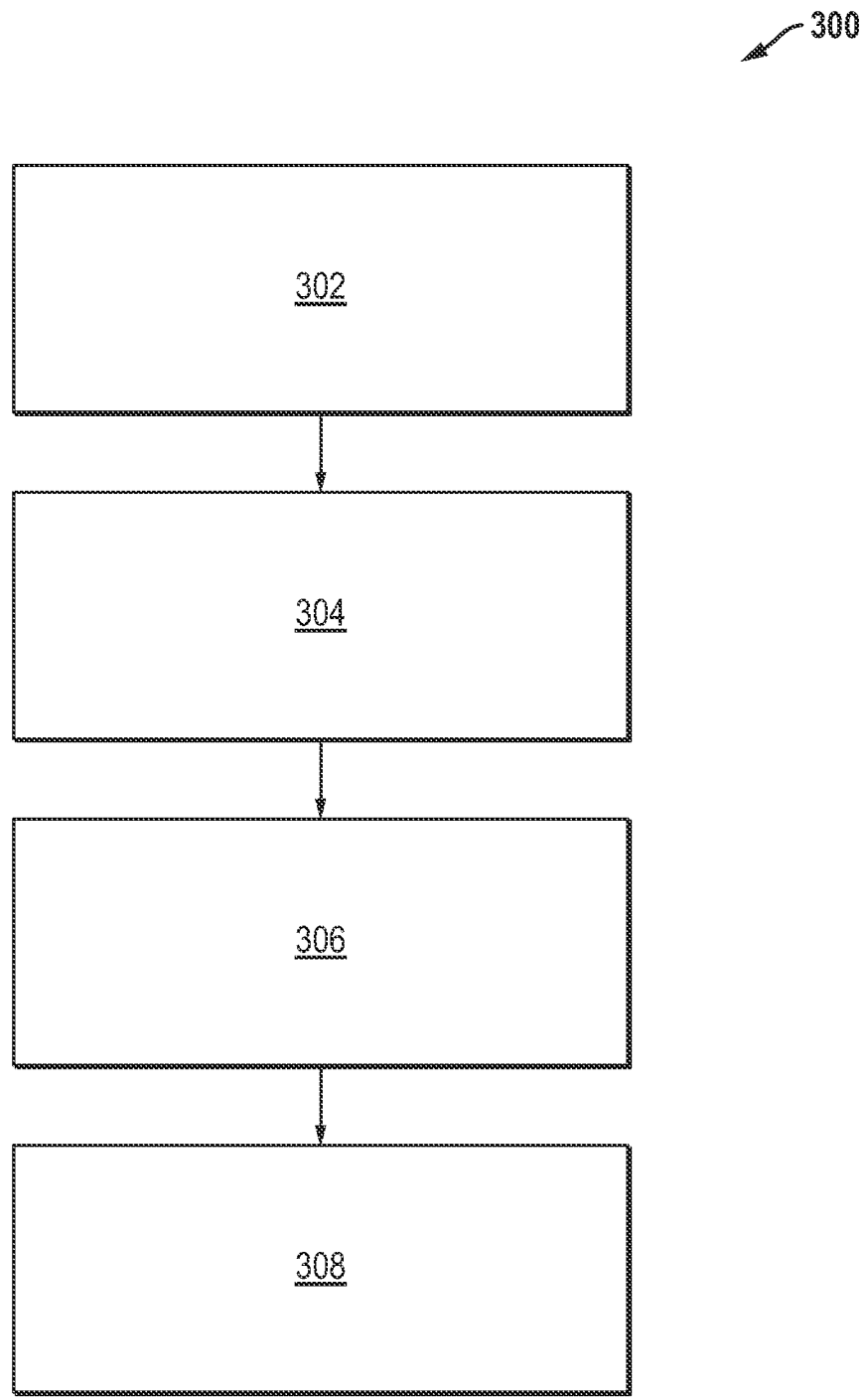
FIG. 3 is a flowchart of a method of preventing leakage in a valve according to an embodiment of the disclosure.

FIG. 3 shows a flowchart of a method 300 of preventing leakage in a valve 100, 200 according to an embodiment of the disclosure. The method 300 may begin at block 302 by providing a valve 100, 200 comprising a valve body 102, 202, a ball 106, 206 selectively rotatable within the valve 100, 200, a seat 112, 212 formed within the valve body 102, 202 and comprising a cavity having an angled wall 118, 218, and a seat insert 112, 212 at least partially disposed within the cavity 110, 210 and having a first sealing surface 124, 224 and a second sealing surface 126, 226. Method 300 may continue at block 304 by operating the valve 100, 200 in cryogenic temperature conditions. Method 300 may continue at block 306 by selectively rotating the ball 106, 206 to prevent fluid flow along a flow path 105, 205 through the valve 100, 200. Method 300 may continue at block 308 by forming and/or maintaining a first sealing interface between the first sealing surface 124, 224 of the seat insert 112, 212 and the ball 106, 206 to prevent leakage through a first leakage path (shown as "1" in FIGS. 1 and 2) and simultaneously forming and/or maintaining a second sealing interface between the second sealing surface 126, 226 and the angled wall 118, 218 to prevent leakage through a second leakage path (shown as "2" in FIGS. 1 and 2) while the ball 106, 206 is selectively rotated to prevent fluid flow along the flow path 105, 205 through the valve 100, 200.

In still other embodiments, the valve 100, 200 may include one or more of the following embodiments:

Embodiment 1. A valve, comprising: a valve body; a ball selectively rotatable within the valve body; a seat formed within the valve body and comprising a cavity having an angled wall; and a seat insert at least partially disposed within the cavity and having a first sealing surface that forms a first sealing interface with the ball to prevent leakage through a first leakage path and a second sealing surface that forms a second sealing interface with the angled wall to prevent leakage through a second leakage path.

Embodiment 2. The valve of embodiment 1, wherein first sealing surface is curved, planar, or combinations thereof.

Embodiment 3. The valve of any of embodiments 1 to 2, wherein the second sealing surface comprises a complementary profile to the angled wall.

Embodiment 4. The valve of embodiment 3, wherein the angled wall is curved, and wherein the second sealing surface is curved.

Embodiment 5. The valve of embodiment 3, wherein the angled wall is planar, and wherein the second sealing surface is curved, planar, or combinations thereof.

Embodiment 6. The valve of any of embodiments 1 to 5, wherein the angled wall forms an angle with a longitudinal axis that is at least 5 degrees and not greater than 90 degrees.

Embodiment 7. The valve of embodiment 6, wherein the angled wall forms an angle with the longitudinal axis that is at least 5 degrees, at least 10 degrees, at least 15 degrees, at least 20 degrees, at least 25 degrees, at least 30 degrees, at least 35 degrees, at least 40 degrees, at least 45 degrees, at least 50 degrees, at least 55 degrees, at least 60 degrees, at least 65 degrees, at least 70 degrees, or at least 75 degrees.

Embodiment 8. The valve of any of embodiments 6 to 7, wherein the angled wall forms an angle with the longitudinal axis that is not greater than 90 degrees, not greater than 85 degrees, not greater than 80 degrees, not greater than 75 degrees, not greater than 70 degrees, not greater than 65 degrees, not greater than 60 degrees, not greater than 55 degrees, not greater than 50 degrees, not greater than 45 degrees, not greater than 40 degrees, not greater than 35 degrees, or not greater than 30 degrees.

Embodiment 9. The valve of any of embodiments 1 to 8, wherein the seat insert comprises a first major surface and a second major surface, wherein the first sealing surface is disposed between the first major surface and the second major surface, and wherein the second sealing surface is disposed between the first major surface and the second major surface.

Embodiment 10. The valve of embodiment 9, wherein the first sealing surface is opposite the second sealing surface.

Embodiment 11. The valve of any of embodiments 1 to 10, wherein the first sealing surface and the second sealing surface form a sealing angle.

Embodiment 12. The valve of embodiment 11, wherein the sealing angle is at least 45 degrees and not greater than 135 degrees.

Embodiment 13. The valve of embodiment 12, wherein the sealing angle is at least 45 degrees, at least 50 degrees, at least 55 degrees, at least 60 degrees, at least 65 degrees, at least 70 degrees, or at least 75 degrees, at least 80 degrees, at least 85 degrees, or at least 90 degrees.

Embodiment 14. The valve of any of embodiments 12 to 13, wherein the sealing angle is not greater than 135 degrees, not greater than 130, not greater than 125 degrees, not greater than 120 degrees, not greater than 115 degrees, not greater than 110 degrees, or not greater than 95 degrees.

Embodiment 15. The valve of any of embodiments 1 to 14, wherein the valve body comprises a fixing plate.

Embodiment 16. The valve of embodiment 15, wherein the fixing plate forms a secondary cavity within the cavity of the seat.

Embodiment 17. The valve of embodiment 16, further comprising: a spring disposed within the secondary cavity.

Embodiment 18. The valve of embodiment 17, wherein the spring biases the seat insert against the angled wall.

Embodiment 19. The valve of embodiment 18, wherein the angled wall forces the seat insert upwards to prevent leakage through secondary leakage path.

Embodiment 20. The valve of embodiment 19, wherein the angled wall increases a sealing force between the seat insert and the seat when cryogenic temperature conditions cause the seat, the seat insert, or combinations thereof to shrink in size.

Embodiment 21. The valve of any of embodiments 17 to 20, wherein the spring comprises a standalone spring.

Embodiment 22. The valve of embodiment 21, wherein the spring is disposed between an extension of the seat insert and the fixing plate.

Embodiment 23. The valve of embodiment 22, wherein the spring biases the extension of the seat insert against the fixing plate to force the seat insert against the angled wall.

Embodiment 24. The valve of any of embodiments 17 to 20, wherein the spring is integrated into the seat insert.

Embodiment 25. The valve of embodiment 24, wherein the spring is disposed in the secondary cavity within a U-shaped cavity of an extension of the seat insert.

Embodiment 26. The valve of embodiment 25, wherein the spring is disposed between a pair of legs of the U-shaped cavity.

Embodiment 27. The valve of embodiment 26, wherein the spring biases an inner leg of the U-shaped cavity against the fixing plate to force the seat insert against the angled wall.

Embodiment 28. The valve of embodiment 27, wherein the extension comprises an interference fit in the secondary cavity.

Embodiment 29. The valve of any of embodiments 17 to 28, wherein the spring is formed from titanium, stainless steel, carbon steel, or combinations thereof.

Embodiment 30. The valve of any of embodiments 1 to 29, wherein the seat insert is formed from PTFE, a fluoropolymer, a perfluoropolymer, PTFE, PVF, PVDF, PCTFE, PFA, FEP, ETFE, ECTFE, PCTFE, a polyarylketone such as PEEK, PEK, or PEKK, a polysulfone such as PPS, PPSU, PSU, PPE, or PPO, aromatic polyamides such as PPA, thermoplastic polyimides such as PEI or TPI, or any combination thereof.

Embodiment 31. The valve of embodiment 30, wherein the seat insert is formed from a material modified with at least one filler.

Embodiment 32. A valve, comprising: a valve body having a longitudinal axis along a flow path through the valve; a ball selectively rotatable within the valve body to selectively allow fluid flow through the valve; a seat formed within the valve body and comprising a cavity having an angled wall; and a seat insert at least partially disposed within the cavity and having a first sealing surface that forms a first sealing interface with the ball to prevent leakage through a first leakage path and a second sealing surface that forms a second sealing interface with the angled wall to prevent leakage through a second leakage path while the ball is selectively rotated to prevent fluid flow through the valve.

Embodiment 33. The valve of embodiment 32, wherein the angled wall increases a sealing force between the seat insert and the seat when cryogenic temperature conditions cause the seat, the seat insert, or combinations thereof to shrink in size.

Embodiment 34. The valve of any of embodiments 20 and 33, wherein the angled wall increases the sealing force between the seat insert and the seat by at least 1%, at least 2%, at least 3%, at least 4%, at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 90%, at least 95%, at least 100%, at least 125%, or at least 150%.

Embodiment 35. The valve of embodiment 34, wherein the angled wall increases the sealing force between the seat insert and the seat by not greater than 500%, not greater than 400%, not greater than 300%, not greater than 200%, or not greater than 100%.

Embodiment 36. A method of preventing leakage in a valve, comprising: providing a valve comprising a valve body, a ball selectively rotatable within the valve, a seat formed within the valve body and comprising a cavity having an angled wall, and a seat insert at least partially disposed within the cavity and having a first sealing surface and a second sealing surface; operating the valve in cryogenic temperature conditions; selectively rotating the ball to prevent fluid flow along a flow path through the valve; and forming or maintaining a first sealing interface between the first sealing surface of the seat insert and the ball to prevent leakage through a first leakage path and simultaneously forming or maintaining a second sealing interface between the second sealing surface and the angled wall to prevent leakage through a second leakage path while the ball is selectively rotated to prevent fluid flow along the flow path through the valve.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A valve, comprising:
a valve body;
a ball selectively rotatable within the valve body;
a seat formed within the valve body and comprising a cavity having an angled wall; and
a seat insert at least partially disposed within the cavity and having a first sealing surface that forms a first sealing interface with the ball to prevent leakage through a first leakage path and a second sealing surface that forms a second sealing interface with the angled wall to prevent leakage through a second leakage path, wherein the valve body comprises a fixing plate forming a secondary cavity within the cavity of the seat, and further comprising: a spring disposed within the secondary cavity and configured to bias the seat insert against the angled wall.

2. The valve of claim 1, wherein first sealing surface is curved, planar, or combinations thereof.

3. The valve of claim 1, wherein the second sealing surface comprises a complementary profile to the angled wall.

4. The valve of claim 3, wherein the angled wall is curved, planar, or combinations thereof, and wherein the second sealing surface is curved, planar, or combinations thereof.

5. The valve of claim 4, wherein the angled wall forms an angle with a longitudinal axis that is at least 5 degrees and not greater than 90 degrees.

6. The valve of claim 1, wherein the seat insert comprises a first major surface and a second major surface, wherein the first sealing surface is disposed between the first major surface and the second major surface, and wherein the second sealing surface is disposed between the first major surface and the second major surface.

7. The valve of claim 6, wherein the first sealing surface is opposite the second sealing surface.

8. The valve of claim 7, wherein the first sealing surface and the second sealing surface form a sealing angle.

9. The valve of claim 8, wherein the sealing angle is at least 45 degrees and not greater than 135 degrees.

10. The valve of claim 1, wherein the angled wall forces the seat insert upwards to prevent leakage through the secondary leakage path.

11. The valve of claim 10, wherein the angled wall increases a sealing force between the seat insert and the seat when cryogenic temperature conditions cause the seat, the seat insert, or combinations thereof to shrink in size.

12. The valve of claim 1 wherein the spring comprises a standalone spring and is disposed between an extension of the seat insert and the fixing plate, and wherein the spring biases the extension of the seat insert against the fixing plate to force the seat insert against the angled wall.

13. The valve of claim 1, wherein the spring is integrated into the seat insert and disposed in the secondary cavity within a U-shaped cavity of an extension of the seat insert.

14. The valve of claim 13, wherein the spring is disposed between a pair of legs of the U-shaped cavity, and wherein the spring biases an inner leg of the U-shaped cavity against the fixing plate to force the seat insert against the angled wall.

15. The valve of claim 1, wherein the spring is formed from titanium, stainless steel, carbon steel, or combinations thereof.

16. The valve of claim 1, wherein the seat insert is formed from PTFE, a fluoropolymer, a perfluoropolymer, PVF, PVDF, PCTFE, PFA, FEP, ETFE, ECTFE, a polyarylketone, PEEK, PEK, or PEKK, a polysulfone, PPS, PPSU, PSU, PPE, or PPO, aromatic polyamides, PPA, thermoplastic polyimides, PEI or TPI, or any combination thereof.

17. The valve of claim 16, wherein the seat insert is formed from a material modified with at least one filler.

* * * * *